(12) United States Patent
Goldenberg et al.

(10) Patent No.: US 8,365,057 B2
(45) Date of Patent: Jan. 29, 2013

(54) PROCESSING OF DATA INTEGRITY FIELD

(75) Inventors: Dror Goldenberg, Zichron Yaakov (IL);
Hillel Chapman, Ein HaEmek (IL);
Achiad Shochat, Rosh-Pina (IL); Peter Paneah, Nesher (IL); Tamir Azarzar, Netanya (IL); Dror Bohrer, Nesher (IL);
Michael Kagan, Zichron Yaakov (IL)

(73) Assignee: Mellanox Technologies Ltd, Yokneam (IL)

( * ) Notice: Subject to any disclaimer, the term of this patent is extended or adjusted under 35 U.S.C. 154(b) by 824 days.

(21) Appl. No.: 12/512,026

(22) Filed: Jul. 30, 2009

(65) Prior Publication Data
US 2011/0029847 A1    Feb. 3, 2011

(51) Int. Cl.
*G06F 7/02* (2006.01)

(52) U.S. Cl. ......... 714/817; 714/762; 714/788; 370/351

(58) Field of Classification Search .................. 714/801, 714/819, 762, 788; 370/351
See application file for complete search history.

(56) References Cited

U.S. PATENT DOCUMENTS

| | | | |
|---|---|---|---|
| 6,289,023 B1 | 9/2001 | Dowling et al. | |
| 6,601,210 B1 | 7/2003 | Kagan | |
| 7,114,009 B2 | 9/2006 | Jones et al. | |
| 7,180,887 B1 * | 2/2007 | Schwaderer et al. | 370/351 |
| 7,334,124 B2 | 2/2008 | Pham et al. | |
| 7,349,992 B2 * | 3/2008 | Moroney et al. | 709/249 |
| 7,359,911 B2 * | 4/2008 | Underseth | 1/1 |
| 7,412,475 B1 | 8/2008 | Govindarajalu | |
| 7,447,975 B2 | 11/2008 | Riley | |
| 7,536,593 B2 * | 5/2009 | Benhase et al. | 714/20 |
| 7,636,767 B2 | 12/2009 | Lev-Ran et al. | |
| 7,804,862 B1 * | 9/2010 | Olson et al. | 370/546 |
| 7,904,713 B1 | 3/2011 | Zajkowski et al. | |
| 7,987,344 B2 * | 7/2011 | Hansen et al. | 712/221 |
| 2003/0091037 A1 | 5/2003 | Latif et al. | |
| 2004/0022256 A1 | 2/2004 | Green | |
| 2004/0153907 A1 | 8/2004 | Gibart | |
| 2004/0267902 A1 | 12/2004 | Yang | |
| 2006/0015654 A1 * | 1/2006 | Krantz et al. | 710/5 |
| 2006/0098681 A1 | 5/2006 | Cafiero et al. | |
| 2007/0091804 A1 | 4/2007 | Pan et al. | |
| 2007/0124415 A1 | 5/2007 | Lev-Ran et al. | |

(Continued)

FOREIGN PATENT DOCUMENTS

WO    2009136933 A1    11/2009

OTHER PUBLICATIONS

U.S. Appl. No. 11/847,367 Official Action dated Oct. 4, 2010.

(Continued)

*Primary Examiner* — Guy Lamarre
(74) *Attorney, Agent, or Firm* — D. Kligler I.P. Services Ltd.

(57) ABSTRACT

A network communication device includes a host interface, which is coupled to communicate with a host processor, having a memory, so as to receive a work request to convey one or more data blocks over a network. The work request specifies a memory region of a given data size, and at least one data integrity field (DIF), having a given field size, is associated with the data blocks. Network interface circuitry is configured to execute an input/output (I/O) data transfer operation responsively to the work request so as to transfer to or from the memory a quantity of data that differs from the data size of the memory region by a multiple of the field size, while adding the at least one DIF to the transferred data or removing the at least one DIF from the transferred data.

24 Claims, 4 Drawing Sheets

U.S. PATENT DOCUMENTS

2011/0083064 A1   4/2011   Kagan et al.

OTHER PUBLICATIONS

U.S. Appl. No. 11/847,367 Official Action dated Jan. 28, 2011.
InterOperability Laboratory, "Fibre Channel Tutorial", 2011 University of New Hampshire.
U.S. Appl. No. 12/398,194 Official Action dated Dec. 10, 2010.
U.S. Appl. No. 12/498,381 Official Action dated Mar. 29, 2012.
U.S. Appl. No. 11/847,367 Official Action dated Apr. 29, 2010.
U.S. Appl. No. 12/398,194 Office Action dated May 20, 2011.
U.S. Appl. No. 11/847,367 Office Action dated Jul. 21, 2011.
Working Draft Project American National Standard T10/1799-D, "Information Technology—SCSI Block Commands—3 (SBC-3)", Revision 19, May 29, 2009.
Kagan et al., U.S. Appl. No. 12/498,381 "Control Message Signature for Device Control" filed on Jul. 7, 2009.
"Mellanox ConnectX IB: Dual-Port InfiniBand Adapter Cards with PCI Express 2.0", Mellanox Technologies, USA, 2008.
"Infiniband Architecture: Specification vol. 1", Release 1.2.1, Infiniband Trade Association, Nov. 2007.
U.S. Appl. No. 12/498,381 Official Action dated Oct. 27, 2011.

\* cited by examiner

PROCESSING OF DATA INTEGRITY FIELD

FIELD OF THE INVENTION

The present invention relates generally to computer networks, and specifically to computing, protecting and verifying data integrity in computer networks, including particularly storage networks.

BACKGROUND OF THE INVENTION

A data integrity field (DIF) is commonly added to a block of data in order to protect against data errors, particularly (but not exclusively) in data storage applications. For example, the T10 Technical Committee of the InterNational Committee for Information Technology Standards (INCITS), which is responsible for standardization of the Small Computer System Interface (SCSI) storage protocol, has standardized the use of a DIF to support end-to-end data protection in storage networks. This DIF is appended to each SCSI data block (also referred to as a sector and typically, although not necessarily, 512 bytes in size). It comprises eight bytes including a 16-bit "Block Guard" cyclic redundancy code (CRC), a 16-bit "Application Tag," and a 32-bit "Reference Tag," which is incremented to ensure that blocks are maintained in the proper order.

The SCSI DIF is just one well-known type of data integrity field, and many other examples exist. In the context of the present patent application and in the claims, the terms "data integrity field" and "DIF" should be understood as referring generally to any data field that is computed over and appended to a block of data and can then be used in verifying that the data in the block have not been corrupted.

InfiniBand™ (IB) is a switched-fabric communications link primarily used in high-performance computing. It has been standardized by the InfiniBand Trade Association. Computing devices (host processors and peripherals) connect to the IB fabric via a network interface adapter, which is referred to in IB parlance as a channel adapter. Host processors (or hosts) use a host channel adapter (HCA), while peripheral devices use a target channel adapter (TCA).

SUMMARY OF THE INVENTION

Embodiments of the present invention that are described hereinbelow provide improved devices, methods and systems for handling DIF fields in a data communication network. The terms "data communication network" and "computer network," as used herein, refer generally to any sort of network over which digital data are transmitted, including (but not limited to) storage networks.

There is therefore provided, in accordance with an embodiment of the present invention, a network communication device, including a host interface, which is coupled to communicate with a host processor, having a memory, so as to receive a work request to convey one or more data blocks over a network. The work request specifies a memory region of a given data size, and at least one data integrity field (DIF), having a given field size, is associated with the data blocks. Network interface circuitry executes an input/output (I/O) data transfer operation responsively to the work request so as to transfer to or from the memory a quantity of data that differs from the data size of the memory region by a multiple of the field size, while adding the at least one DIF to the transferred data or removing the at least one DIF from the transferred data.

In disclosed embodiments, the network interface circuitry includes a DIF engine, which is configured to compute a value of the at least one DIF over the one or more data blocks. Typically, the DIF engine is configured to verify the at least one DIF by comparing the computed value to a previously-generated value of the at least one DIF that is appended to the one or more data blocks. In one embodiment, the network interface circuitry is configured to generate a completion report, for output to the host processor, upon completion of the I/O data transfer, and to incorporate an error indication in the completion report when the DIF engine detects an error in verifying the at least one DIF. In another embodiment, the previously-generated value of the at least one DIF is computed in accordance with a first DIF type, and the DIF engine is configured to remove the previously-generated value of the at least one DIF and to compute and add to the transferred data a new DIF in accordance with a second DIF type. Additionally or alternatively, the DIF engine is configured to interleave the at least one DIF with the one or more data blocks. Typically, the DIF engine is configured to compute the value of the at least one DIF on the fly, without maintaining a copy of the transferred data.

In a disclosed embodiment, the network interface circuitry includes a DIF strip array for receiving the at least one DIF upon removal of the at least one DIF from the transferred data.

Typically, the data size of the memory region is equal to a number of bytes that are to be conveyed over the network by the I/O data transfer operation.

In some embodiments, the memory region is defined in a virtual memory space, and the network interface circuitry includes a table containing parameters indicating a range of physical addresses in the memory corresponding to the virtual memory space, and the parameters include an offset corresponding to the at least one DIF that is to be added to or removed from the transferred data.

In one embodiment, the work request corresponds to a command to write the data from a storage initiator to a storage target, and the I/O data transfer operation includes a RDMA read operation invoked in response to the work request, including a RDMA read request sent from the storage target to the storage initiator and a RDMA read response conveying the data from the storage initiator to the storage target. In another embodiment, the work request corresponds to a command from a storage initiator to read the data from a storage target, and the I/O data transfer operation includes a RDMA write operation, invoked in response to the work request, conveying the data from the storage initiator to the storage target.

There is also provided, in accordance with an embodiment of the present invention, a method for communication, including receiving a work request from a host processor to convey one or more data blocks over a network. The work request specifies a memory region of a given data size, and at least one data integrity field (DIF), having a given field size, is associated with the data blocks. Network interface circuitry executes an input/output (I/O) data transfer operation responsively to the work request so as to transfer to or from the memory a quantity of data that differs from the data size of the memory region by a multiple of the field size, while adding the at least one DIF to the transferred data or removing the at least one DIF from the transferred data.

The present invention will be more fully understood from the following detailed description of the embodiments thereof, taken together with the drawings in which:

DETAILED DESCRIPTION OF EMBODIMENTS

Overview

Figure 1:
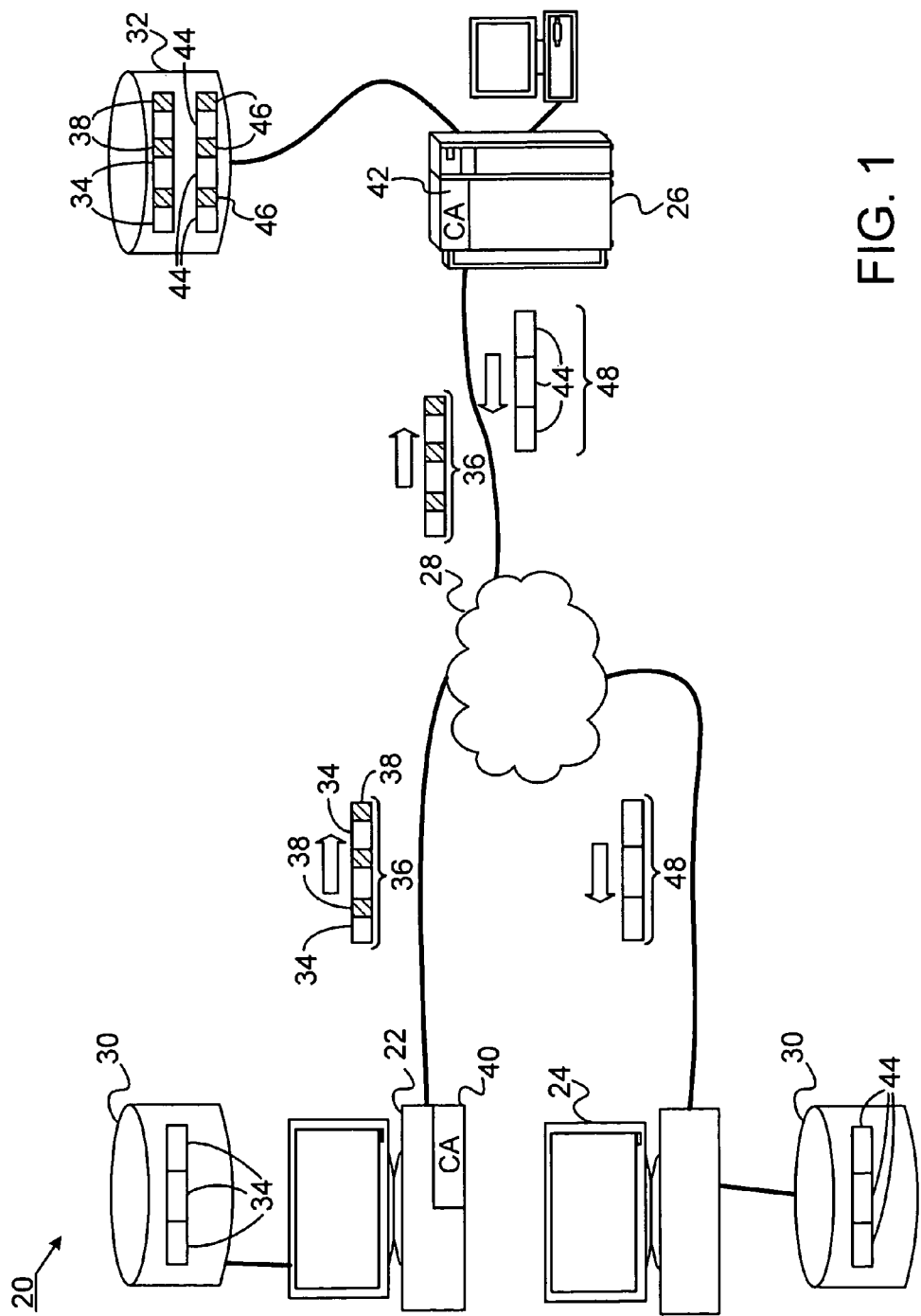
FIG. 1 is a block diagram that schematically illustrates a computer network system, in accordance with an embodiment of the present invention.

Storage devices, such as SCSI-compliant storage servers, frequently store a DIF in memory together with each data block (or at least with some data blocks). On the other hand, host devices frequently store data in regular sectors that are equal to the block size, such as 512 bytes, without the DIF. It therefore becomes necessary to add or strip the DIF from the data at different points in data transfer between storage initiators and storage targets. The need to add and strip the DIF, as well as verifying the DIF against the associated data, complicates the software of the host and storage devices and increases the computational and memory bandwidth burdens on the processors that are involved.

Input/output (I/O) data transfer operations are defined in the context of the present patent application and in the claims as operations that move data directly from the memory of one computer to another across a network without involving the computer operating systems. Examples of I/O data transfer operations include remote direct memory access (RDMA) operations in InfiniBand (IB) and Ethernet networks and the equivalent sort of direct data placement and data transport operations that are carried out by the host bus adapter (HBA) in handling I/O read and write operations in Fibre Channel networks, as well as in the Fibre Channel over Ethernet protocol.

I/O data transfer operations are supported by hardware in some network interface adapters, such as the ConnectX™ HCA offered by Mellanox® Technologies (Sunnyvale, Calif.). The channel adapter is thus able to perform I/O data transfer operations at very high speed while relieving the host processor of the burden of communication transport. Although designed to meet IB specifications, the ConnectX HCA also offers an Ethernet link interface, which enables it to transmit and receive Ethernet, as well as IB, packets, and can also be configured to support the Fibre Channel Protocol (FCP) (which implements the Small Computer System Interface—SCSI—over Fibre Channel networks). The term "channel adapter," as used in the present patent application and in the claims, should thus be understood as referring generally to network interface devices that implement I/O data transfer functions in hardware, unless specified otherwise. Although the embodiments described below refer specifically to RDMA, the principles of the present invention may similarly be applied to other I/O data transfer protocols.

In embodiments of the present invention that are described hereinbelow, DIF-related operations are offloaded from the processor to dedicated circuitry in a channel adapter, which links the processor to a network. Specifically, in some embodiments, DIF handling is integrated with RDMA and/or other I/O data transfer functions in the channel adapter. The channel adapter is configured to permit transparent communications between an initiator and a target regardless of whether or not one or both of them (or neither of them) support and store DIF. As part of the I/O data transfer operation, the channel adapter will automatically add or strip the DIF from an associated data block as needed, and may also validate the DIF if required.

In some embodiments of the present invention, I/O data transfers are invoked by work requests that specify a memory region containing the data to be transferred. In order to provide the appropriate support for both DIF-enabled and non-DIF devices, while preserving consistent protocol semantics, work requests that involve DIF processing specify the data size of the memory region so as to correspond to the length of the data to be transferred over the network (including the field size of the DIF as appropriate), regardless of whether or not the host processor actually supports and stores DIF. Context information associated with the memory region indicates to the channel adapter, at the time of execution of the I/O data transfer operation, what DIF operations are required.

If the host processor does not store DIF in its memory, the quantity of data transferred to or from the host memory by the I/O data transfer operation may be smaller than the data size of the specified memory region, by an amount equal to a multiple of the field size of the DIF (by the number of DIF-protected blocks to be transferred). In other words, the memory region will contain a range of virtual memory that is larger than the range of physical host memory to which it actually corresponds. The channel adapter automatically generates and adds the DIF to outgoing data or strips the DIF from incoming data, as required, and thus makes up the difference between the size of the memory region and the amount of data actually transferred to or from the memory.

Of course, the channel adapter is also capable of supporting data transfers in which both the initiator and target do store DIF with the data or both do not store DIF. In these cases, the amount of data transferred to or from the memory is typically equal to the memory region size specified by the I/O work request. In the former case, the channel adapter may still be called upon to validate and/or recalculate and replace the DIF of some or all data blocks. Additionally or alternatively, the channel adapter of the target may compute and store a DIF with data that was sent without a DIF by the initiator.

System Description

FIG. 1 is a block diagram that schematically illustrates a network communication system 20, in accordance with an embodiment of the present invention. One or more host computers 22, 24 are connected to communicate with a storage server 26 via a switched network 28. In the description that follows, network 28 will be assumed, for convenience and clarity, to comprise an IB switched fabric. Alternatively, network 28 may comprise another type of switched network, such as an Ethernet or Fibre Channel network (or other storage network). Further additionally or alternatively, components of system 20 may be configured to support other data transport protocols, such as the Fibre Channel Protocol, over the IB or Ethernet network infrastructure, as described, for example, in U.S. patent application Ser. No. 12/398,194, filed Mar. 5, 2009, whose disclosure is incorporated herein by reference.

In accordance with common usage in storage protocols and applications, host computers 22, 24 will also be referred to herein as "initiators," while server 26 is referred to as a "target." These terms are used for convenience only, however, and not limitation: The devices and methods described hereinbelow may similarly be applied in host-to-host and target-to-target transfers.

Host computers 22 and 24 comprise local memories 30, while server 26 has a memory 32. These memories typically comprise both random access memory (RAM) and disk storage, but the distinction between the two is immaterial to the present embodiment. I/O write operations, in the context of system 20, involve transfer of data from memories 30 to memory 32, while I/O read operations transfer data in the opposite direction.

As an example of an I/O write operation, computer 22 may initiate a transfer of data blocks 34 in its memory 30 to server 26. The transfer is carried out by a host channel adapter (marked for brevity as CA) 40, which generates a data packet 36 containing blocks 34, along with a DIF 38 associated with each block. (The term "block," as used herein, refers to the smallest data unit to which a DIF may be appended in accordance with the applicable protocol. Such blocks are sometimes referred to as "sectors.") The DIFs are computed and interleaved with blocks 34 in packet 36 by CA 40, as described hereinbelow. A host or target channel adapter (CA) 42 at server 26 receives packet 36 from network 28 and, optionally, verifies DIFs 38 against the corresponding data blocks 34 to ensure that the data have not been corrupted. CA 42 then writes the data blocks and corresponding DIFs to memory 32.

As an example of an I/O read operation, computer 24 may initiate a transfer of data blocks 44 from server 26 to memory 30 of computer 24. Data blocks 44 are stored in memory 32 initially along with corresponding DIFs 46. The I/O read command from computer 24, however, indicates that computer 24 does not support DIF. (The SCSI protocol, for example, provides command fields that indicate to the target whether or not the initiator supports DIF.) Therefore, before inserting data blocks 44 into a packet 48 for transmission over network 28, CA 42 strips DIFs 46 from the data. Optionally, again, CA may verify the DIFs against the corresponding data blocks before transmitting the packet. Computer 24 receives packet 48 and stores data blocks 44 in its memory.

Other DIF use cases are also supported by system 20. For example, in contrast to the cases shown in the figure, the initiator and the target in a given operation may both store the DIF, or neither of them may store the DIF. Even when both initiator and target store the DIF, it is possible that only one side actually computes and uses the DIF for data verification, while the other side simply stores and returns the DIF as though it were a part of the data. As another example, a initiator may transfer data without a DIF, and the target may compute and store the DIF with the data that it receives.

Figure 2:
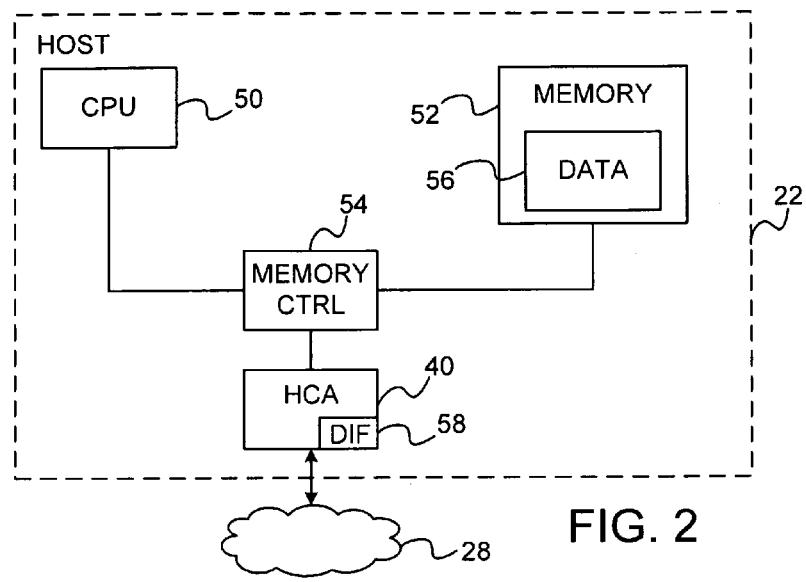
FIG. 2 is a block diagram that schematically shows details of a host computer, in accordance with an embodiment of the present invention.

FIG. 2 is a block diagram that schematically shows details of host computer 22, in accordance with an embodiment of the present invention. The computer comprises a host processor 50, which typically comprises one or more general-purpose central processing units (CPU), and a system memory 52, connected to the host processor by a suitable memory controller 54, as is known in the art. (Memory 52 may be considered a part of memory 30, shown in FIG. 1.) Memory 52 holds data 56, as well as metadata structures that are accessed and used by HCA 40 in managing data transfer operations. HCA 40 comprises network interface circuitry for connecting computer 22 to network 28 and includes DIF processing circuits 58, which are described in detail hereinbelow.

For convenience and clarity, the operation of HCA 40 and other elements of system 20 will be described hereinbelow with reference to IB conventions and terminology. Client processes running on computer 22 communicate with the transport layer of the IB fabric by manipulating a transport service instance, known as a "queue pair" (QP), which is made up of a send work queue and a receive work queue. A given client may open and use multiple QPs simultaneously. Each QP has a QP context (QPC), which may be held in memory 52. The QPC is used and updated by HCA 46 in the course of processing communications on that QP. (For comparison, the Fibre Channel Protocol uses "exchanges," rather than QPs. Certain devices, such as the above-mentioned ConnectX HCA, may internally map such exchanges to QPs in order to implement Fibre Channel Protocol operations.)

To send and receive communications over network 28, the client process initiates work requests (WRs), which causes work items to be placed in the appropriate queues. The HCA then executes the work items. Upon completion of a work item, the HCA writes completion reports, known as completion queue elements (CQEs) to appropriate queues, which are then read by the client process as an indication that the WR in question has been completed.

For any given operation, the QP that initiates the operation, i.e. injects a message into network 28, is referred to as the requester, while the QP that receives the message is referred to as the responder. (A given QP can be both a requester and a responder in different operations.) An IB operation is defined to include a request message generated by the requester and, as appropriate, its corresponding response generated by the responder. Each IB message consists of one or more IB packets, depending on the size of the message payload compared to the maximum transfer unit (MTU) of the message path.

Typically, a given channel adapter will serve simultaneously both as a requester, transmitting request messages and receiving responses on behalf of local clients, and as a responder, receiving request messages from other channel adapters and returning responses accordingly. Request messages include, inter alia, RDMA write and send requests, which cause the responder to write data to a memory address at its own end of the link, and RDMA read requests, which cause the responder to read data from a memory address and return it to the requester. RDMA read and write requests specify the memory range to be accessed by DMA in the local memory of the responder. Send requests rely on the responder to determine the memory range to which the message payload will be written. (Again, other protocols, such as Fibre Channel, may use different terminology, but provide similar sorts of I/O data transfer functions, which may be handled using the methods and devices described herein, mutatis mutandis.)

IB specifications provide a number of different types of work requests. In the embodiments described hereinbelow, it will be assumed that the work requests used to invoke I/O write and read operations are Fast Registration Work Requests (FRWRs), which identify memory region (MR) objects for transfer from or to the initiator. Each such MR object includes the DIF policy and DIF values to be associated with the data transfer and describes the layout of the data and DIF in memory. When preparing to carry out the actual RDMA operation for purposes of the data transfer, HCA 40 accesses the DIF-related parameters of the MR in question and thus determines the type of DIF offload operations to be performed by circuits 58 in each case.

The table below shows the modes of DIF operations that are supported by the channel adapters in system 20:

| DIF Mode | | Initiator | | Target | |
|---|---|---|---|---|---|
| | | On Incoming | On Incoming | On Outgoing | On Outgoing |
| Mem | Wire | RDMA RD | RDMA WR | RDMA WR | RDMA RD |
| No DIF | No DIF | Gather: as-is Send to wire: as-is | Data arrives: as-is Scatter: as-is | Gather: as-is Send to wire: as-is | Data arrives: as-is Scatter: as-is |
| No DIF | DIF | Gather: as-is Send to wire: DIF is added | Data arrives: with DIF Scatter: DIF is stripped * DIF verify is allowed | Gather: as-is Send to wire: DIF is added | Data arrives: with DIF Scatter: DIF is stripped * DIF verify is allowed |
| DIF | No DIF | Gather: Data with DIF Send to wire: DIF is stripped * DIF verify is allowed | Data arrives: without DIF Scatter: DIF is added | Gather: Data with DIF Send to wire: DIF is stripped * DIF verify is allowed | Data arrives: without DIF Scatter: DIF is added |
| DIF | DIF | Gather: as-is (data + DIF) Send to wire: as-is (data + DIF) * DIF verify is allowed * DIF replace is allowed | Data arrives: as-is (data + DIF) Scatter: as-is (data + DIF) * DIF verify is allowed * DIF replace is allowed | Gather: as-is (data + DIF) Send to wire: as-is (data + DIF) * DIF verify is allowed * DIF replace is allowed | Data arrives: as-is (data + DIF) Scatter: as-is (data + DIF) * DIF verify * DIF replace is allowed |

The term "Wire" in the table above refers to network 28. The actions in the "Incoming RDMA RD" column are taken when the HCA generates the RDMA read response, while those in the "Outgoing RDMA RD" column are taken then the HCA receives the RDMA read response.

Figure 3:
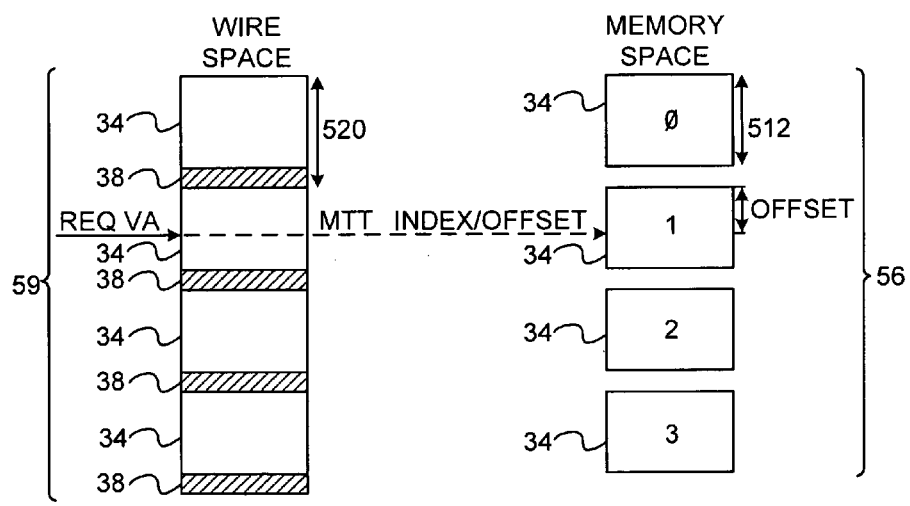
FIG. 3 is a block diagram showing memory spaces associated with a data transfer, in accordance with an embodiment of the present invention.

FIG. 3 is a block diagram that schematic shows memory spaces that are associated with a data transfer over network 28, in accordance with an embodiment of the present invention. In this example, it is assumed that data 56 to be transferred over the network comprise data blocks 34, of 512 bytes each, in memory 52, without DIF fields. This particular block size is in accordance with SCSI convention, but other block sizes may likewise be supported. The column of blocks 34 on the right side of the figure, in other words, represents actual allocation of physical host memory space. Although blocks 34 are shown in the figure as being discontiguous, to emphasize their correspondence with the blocks in the column on the left side of the figure, the actual data blocks may be contiguous or distributed in any other suitable manner in the memory.

The left column in FIG. 3 shows a memory region 59 that is used in transfer of data 56 by RDMA. The memory region is defined in virtual memory space. One or more entries in a memory translation table (MTT) define the correspondence, in terms of index and offset, between any requested virtual address (VA) in the memory region and the corresponding physical address in memory 52. The MTT implements elements of the translation protection table (TPT) functions that are defined by the InfiniBand specification. The data size of the memory region corresponds to the quantity of data that will be transmitted over network 28 (referred to in the figure as "wire space"), wherein each data block 34 and its corresponding DIF 38 are assumed to occupy 520 bytes, in accordance with SCSI convention.

Thus, the data size of memory region 59 that is specified in virtual memory space for purposes of the RDMA transfer differs from the actual quantity of data 56 that is transferred to or from memory 52. The difference is a multiple of the field size of DIF 38 (in this example, eight bytes per DIF). DIF processing circuits 58 add or remove the DIF fields as required. The entries in the MTT contain the necessary offset for each block 34 so that the blocks are discontiguous in the virtual memory space, as shown in the left column in FIG. 3, and the gaps interleaved between the blocks in the virtual memory space will be occupied by the corresponding DIFs. There may be a single MTT entry of this sort corresponding to each block. Alternatively, the MTT entries may include a replication parameter so that each entry can correspond to multiple blocks, thus limiting the MTT "table" to a more manageable size and reducing the overhead involved in memory registration and other functions associate with I/O operations.

When DIF values are held in memory 52, they are typically stored contiguously with the data blocks that they protect. Alternatively, the DIF values may be stored in a separate location from the data. To support this sort of possibility, the TPT may contain two address pointers per block: one for the data, and the other for the DIF.

In an alternative embodiment, the MTT can be eliminated entirely by using a simple one-to-one mapping between virtual and physical addresses, based on the block index values, for example.

In the example shown in FIG. 3, as noted above, memory region 59 in virtual memory space, corresponding to the quantity of data to be transferred over network 28, is larger than the physical space actually occupied by the data 56 that is to be transferred to or from memory 52. Alternatively, when data are stored in the memory together with DIFs, but are transferred over the network without the DIFs, the memory region (in virtual memory space) used by HCA 40 in handling the data transfer will be smaller than the actual data size in the memory. Again, DIF circuits 58 add or remove the DIF as required, and the MTT entries maintain the correspondence between the virtual and actual memory blocks. The data blocks in FIG. 3 are marked with their respective indices (0, 1, 2, 3, . . . ). In this example, the MTT generates a pointer to block index 1, with a certain offset. In cases in which DIF circuits 58 are not required to add or remove DIFs from the data, the size of the memory region in virtual memory space will be equal to the actual data size in the memory.

Figure 4:
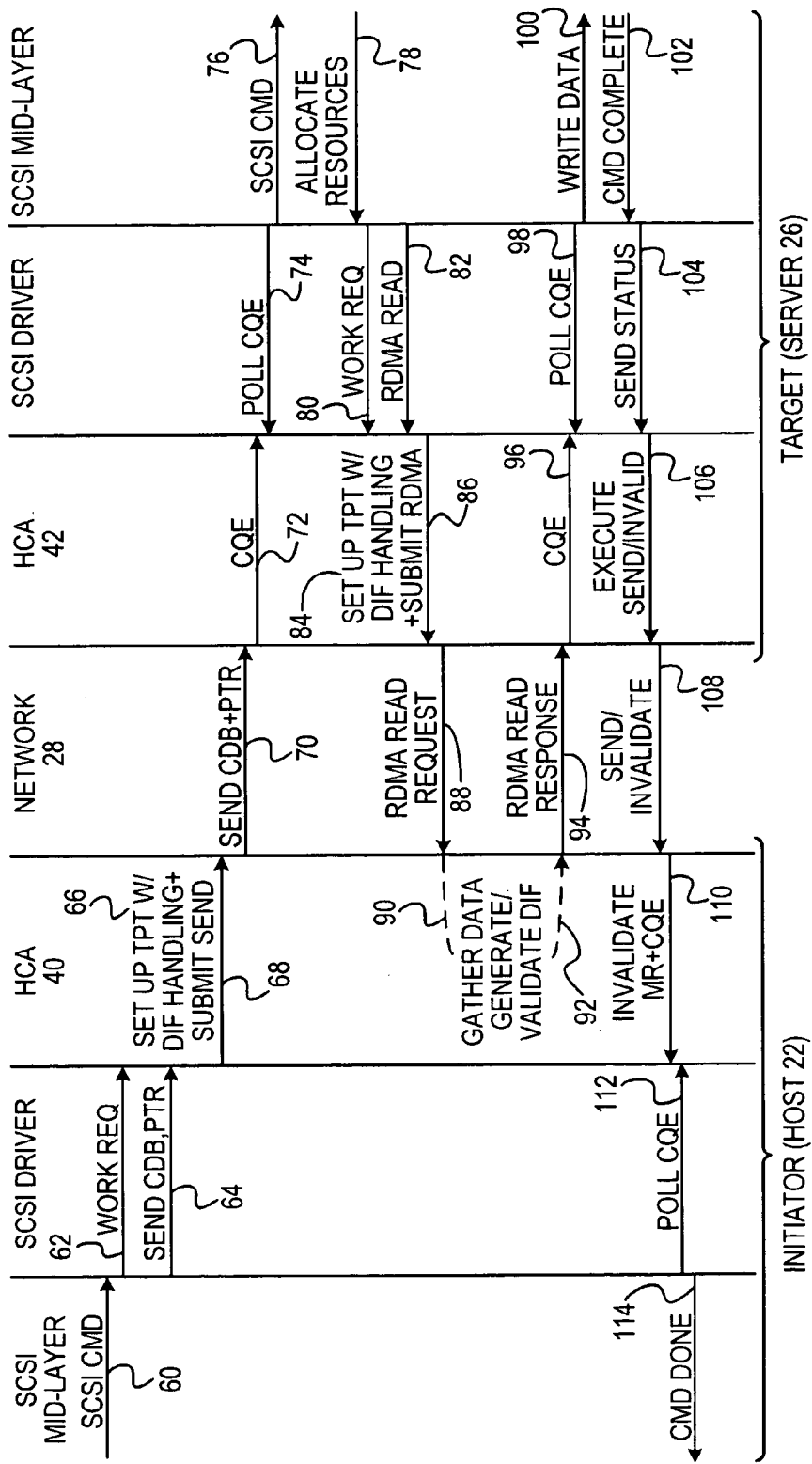
FIG. 4 is a communication flow diagram that schematically illustrates a method for carrying out a storage command, in accordance with an embodiment of the present invention.

FIG. 4 is a communication flow diagram that schematically illustrates a method for carrying out a storage command, in accordance with an embodiment of the present invention. This flow shows actions taken at both the initiator (host computer 22) and target (server 26) sides of the interaction, and assumes, for the sake of completeness, that both the initiator and the target are equipped with respective HCAs with DIF-offload capabilities. Alternatively, the initiator flow shown in this figure may be used in transferring data to or from a target whose network interface adapter is not DIF-capable, or the target flow may be used in data transfers from or to initiators without DIF-capable network interface adapters. In these cases, any necessary DIF-related functions may be carried out in software on the host processor in question, as is known in the art.

The communication flow in FIG. 4 is initiated when SCSI mid-layer software running on host computer 22 invokes a SCSI command 60. In this example, it will be assumed that the command is an I/O write command, which requires data to be transferred from computer 22 to server 26, in accordance with the scenario shown in FIG. 1 (in which HCA 40 adds DIFs 38 in generating packets such as packet 36). The communication flow for I/O read commands is very similar.

In response to command 60, SCSI device driver software running on the host computer generates one or more work requests 62 to HCA 40. Two work requests may actually be generated at this point: As noted above, an IB work request of the FRWR type may conveniently be used to create the MR object that describes the I/O operation, DIF handling, and memory layout of the data buffers. Optionally, the work request may specify multiple memory regions. An IB Send work request specifies a command descriptor block (CDB) and a pointer 64 to a memory region to be used in the data transfer.

HCA 40 sets up appropriate entries 66 in its TPT based on the work request, and processes an IB Send work item 68 in response to the work request placed in the appropriate send queue by the driver software. The TPT entries include context information for the specified memory region, giving the displacement of the data buffer and indicating the DIF operations (add/remove, verify) that will be performed by the HCA during data transfer, as well as initial DIF tags. (In the example shown in FIG. 1, HCA 40 will compute and add DIFs 38 to data blocks 34.) As an alternative to the FRWR mentioned above, work requests 62 may comprise a Fast Memory Registration (FMR) work request, in which the device driver software, rather than the HCA, writes the TPT entries.

In accordance with the work request, HCA 40 transmits the I/O write command (CDB) in an IB Send message 70 via network 28 to HCA 42. This message includes the CDB and pointer, in order to enable HCA 42 subsequently to access the appropriate data via RDMA. Upon receiving message 70, HCA 42 places the message contents in the appropriate receive queue and generates a CQE 72 to indicate to server 26 that a message has been received. An interrupt and event message are typically generated at this point to "wake up" the SCSI device driver software running on the server. The driver software polls its completion queue 74 and, upon detecting CQE 72, passes a SCSI write command 76 to the SCSI mid-layer software running on the server.

The SCSI software on server 26 causes the server to allocate resources 78, such as memory buffers, in order to accept the data that will be conveyed from computer 22. The SCSI driver on the server submits a work request (typically a FRWR) specifying the memory region to be used on the server in receiving the data and a RDMA read work request 82 specifying the data to be read from host computer 22, using information provided in the CDB that was sent in message 70. HCA 42 sets up appropriate entries in its own TPT 84 to indicate the DIF operations to be performed on the specified memory region when the data arrive (In the example shown in FIG. 1, HCA 42 may verify the DIFs of the incoming data blocks as they arrive.) HCA 42 places a RDMA read request work queue element (WQE) 86 in the send queue of the appropriate QP. When the WQE reaches the head of the queue, a RDMA read request message 88, containing the appropriate pointer and MR number, is transmitted over network 28 to HCA 40.

Upon receiving message 88, HCA 40 refers to its own TPT to find the context of the memory region specified by the message. As noted above, this context indicates the locations in physical memory from which the data are to be read, as well as the DIF operations to be performed on the data. Based on the context information, the HCA gathers data 90 from the host memory and, in the present example, generates DIFs 92 and interleaves them with the data in the appropriate locations in a RDMA read response 94. (Thus, the original SCSI I/O write command results in execution of a RDMA read operation. A SCSI I/O read command by the initiator, on the other hand, will lead to a RDMA write request message from server 26 at this stage, containing the requested data and, possibly, DIFs. The RDMA write request will cause HCA 40 to write the data to the memory of the host computer while stripping and/or verifying the DIFs.)

When HCA 42 receives read response 94, it places the incoming data packets in the appropriate receive queue for transfer to the server memory, and then issues a CQE 96. If required, the HCA may verify the DIFs of the incoming data blocks. If HCA 42 discovers an invalid DIF at this stage, it places an error indication in CQE 96, to indicate that although the RDMA operation completed successfully at the network level, the SCSI application-level software may need to take some corrective action.

SCSI software running on server 26 discovers the CQE by polling 98, and then (assuming there is no error indication) informs the SCSI mid-layer that data 100 from the incoming packets has been successfully written to the server memory. The server software then returns a command completion indication 102, which causes the SCSI driver to generate a Send work request 104 to HCA 42 to send a completion status message to HCA 40 of computer 22. The SCSI driver may also invalidate the memory region that HCA 42 used in handling the incoming data, so that it can be reused in a subsequent data transfer.

Work request 104 causes an IB Send/Invalidate work item 106 to be placed in the send queue of HCA 42. Upon executing this work item, HCA 42 transmits a Send/Invalidate message 108 over network 28 to computer 22. Upon receiving this message, HCA 40 invalidates TPT entries 66 corresponding to the memory region that was used in the data transfer and issues a CQE 110 to host computer 22. HCA 40 may place an error indication in the CQE, in a manner analogous to (though slightly different from) that described above with respect to CQE 96. HCA 40 typically issues an interrupt and event message in order to wake up the SCSI device driver software. The device driver software discovers the CQE by polling 112, and then issues a command completion indication 114 to the SCSI mid-layer software, indicating that the I/O write operation has been successfully completed.

As noted above, the flow of operations in handling a SCSI I/O read command will be similar to that described above, and a full description of all the steps involved would be redundant. The SCSI I/O read command will cause server 26 to execute a RDMA write operation, to which host 22 will respond with an acknowledgment (ACK) packet. If HCA 42 detects a DIF error on transmission of the RDMA data, it will record the DIF error (possibly blocking the incoming packet flow until it has done so). When the ACK arrives, HCA 42 will then issue a CQE with the error indication. Similarly, if HCA 40 detects a DIF error in the incoming RDMA data, it will issue a CQE with an error indication upon receiving the Send/Invalidate message from server 26.

Unlike SCSI, the Fibre Channel Protocol (FCP) does not call for an ACK to be sent in response an I/O data transfer to the host. Therefore, when FCP is used, HCA internally generates an "ACK" following data transmission. This internal ACK causes HCA 42 to issue a CQE with an error indication, as described above.

Although the flow described above relates to RDMA operations, in other embodiments of the present invention, a network interface device may apply DIF operations to other types of data packets, such as IB Send packets. For example, in an I/O write operation from host 22 to server 26, HCA 40 may incorporate one or more blocks of data with DIFs in the Send packet that may contain other information, as well. To implement this sort of scheme, the device driver software may submit a Send work request specifying one MR, without DIF, containing some information, and one or more additional MRs, with DIF, for the data. The receive side may handle the contents of the packet (DIF on the data, no DIF on the other information) in similar fashion.

Figure 5:
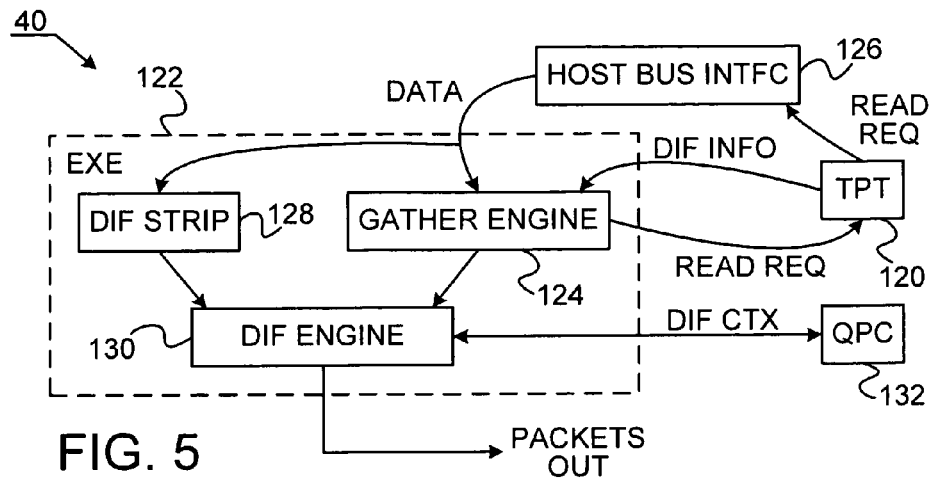
FIGS. 5 and 6 are block diagrams that schematically show details of a channel adapter with DIF support, in accordance with an embodiment of the present invention.
Figure 6:
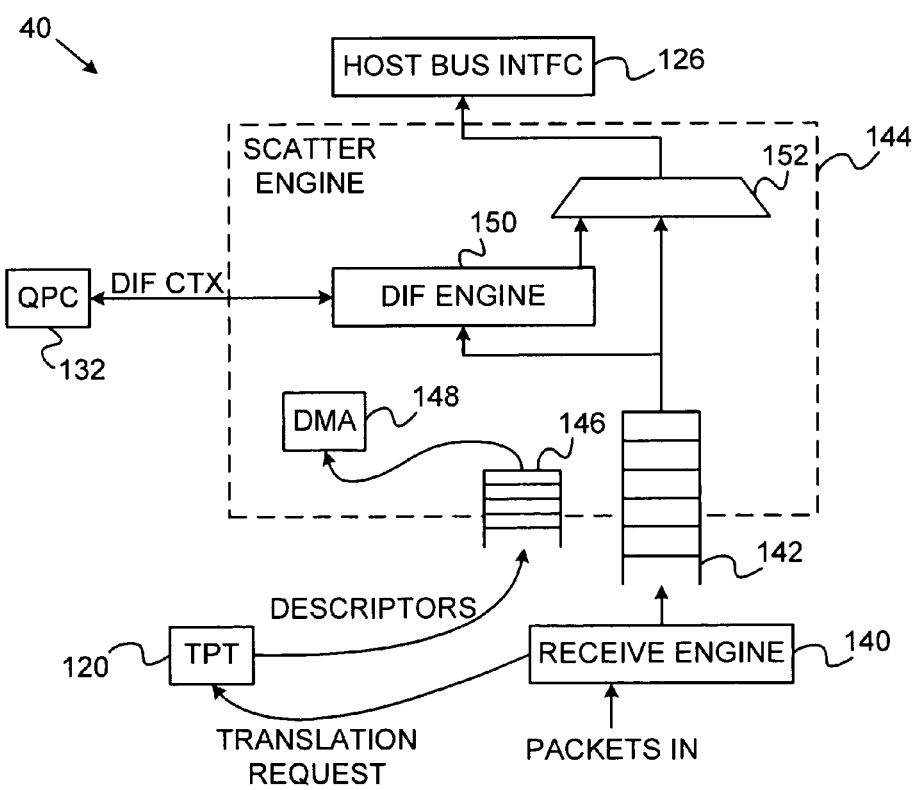

FIGS. 5 and 6 are block diagrams that schematically show details network interface circuitry in channel adapter 40, illustrating particularly the components of the channel adapter that are involved in DIF support, in accordance with an embodiment of the present invention. FIG. 5 shows the components used in generating outbound data packets for transmission (also known as "data gather"), while FIG. 6 shows the components used in processing inbound data packets received from the network ("data scatter"). Typically, the components shown in FIGS. 5 and 6 are functional elements that are incorporated together in an integrated circuit device used in the channel adapter. Only those elements that are directly involved in DIF-related operations of the channel adapter are shown, for the sake of simplicity; the remaining elements needed to make a complete channel adapter will be apparent to those skilled in the art. The configurations shown in FIGS. 5 and 6 represent one mode of implementation of DIF support in a channel adapter. Other implementations of the methods of DIF support described hereinabove will be apparent to those skilled in the art and are considered to be within the scope of the present invention.

As shown in FIG. 5, an execution engine 122 in the channel adapter is responsible for assembling the data that are to be inserted in outbound packets. Engine 122 comprises a gather engine 124, which reads data for transmission from the host memory. Upon receiving a work item specifying data to be transmitted on a given QP, the gather engine submits a read request to a TPT 120, asking for information concerning the memory region in question.

The TPT responds with DIF information concerning the memory region (assuming this memory region calls for DIF processing), indicating the type of DIF-related operations that will be required, such as addition, removal and/or verification, as well as DIF tag values. The DIF information may also include a length parameter, indicating the difference in size between the memory region in virtual memory space and the actual size of the data in host memory, as explained above. Execution engine 122 may use the length parameter, for example, in determining the number of bytes of data to read from memory into each outbound packet.

Using the memory translation parameters for the specified memory region, TPT 120 issues one or more read requests to a host bus interface 126, indicating the physical address range in the host memory that is to be read out to the channel adapter. When execution engine 122 then receives the data from interface 126, the data blocks are collected by gather engine 124. If DIFs are present in the data stored in host memory but are not to be transmitted over network 28, they are directed to a DIF strip array 128.

A DIF engine 130 performs the required DIF operations on the data blocks collected by gather engine 124 before they are incorporated into outgoing packets. For example, when the DIFs were not stored with the data blocks in host memory, the DIF engine may compute the DIF value for each data block and interleave the DIFs with the data in the appropriate locations. (In this case, DIF strip array 128 will be empty.) As another example, the DIF engine may compute DIF values for the data blocks collected by the gather engine and compare these values to those in array 128 in order to verify the data integrity. The data blocks may then be transmitted with or without the DIFs, depending on the memory region parameters. DIF context information (DIF CTX), such as intermediate values of CRC computations on data blocks that cross packet boundaries, may be stored as part of a QP context (QPC) 132, which can be accessed by the DIF engine as needed. The DIF engine does not need to maintain a copy of the data during this operation, but rather operates on the fly, at the wire speed of data transfer.

Although the embodiments described hereinabove assume that the same DIF is used throughout the system, a network interface device in accordance with an alternative embodiment of the present invention may be configured to convert between different types of DIF. For example, host 22 may protect data in its own memory using a DIF containing a checksum, while data transmitted over network 28 are protected by a different DIF that contains a CRC. In such embodiments, DIF engine 130 may strip and validate the checksum in the data blocks that it reads from memory 52, and may also compute and insert CRC-based DIFs into the data packets that it outputs. The inverse protection conversion operation may be performed on data packets received from the network.

Referring now to FIG. 6, inbound packets are processed by a receive engine 140, which places the packet contents in a data first-in-first-out (FIFO) buffer 142 to await processing by a scatter engine 144. Based on the information in each packet, the receive engine submits a write translation request to TPT 120, which looks up the appropriate parameters and places corresponding descriptors in a descriptor FIFO buffer 146. For RMDA operations of the types described above, the descriptors include memory pointers indicating the physical locations in host memory to which data are to be written by the scatter engine. The descriptors may also indicate DIF operations that are to be applied to the data. A direct memory access (DMA) engine 148 manages the transfer of data and CQEs to the host memory in accordance with the descriptors.

A DIF engine 150 performs DIF operations on incoming data, in accordance with the descriptors generated by TPT 120. For example, when a packet containing DIFs reaches the head of FIFO buffer 142, the DIFs may be stripped from the data and passed to DIF engine 150 for removal and/or verification. Alternatively or additionally, the DIF engine may compute new DIFs to interleave with the data blocks for storage in the host memory. Again, the DIF engine performs these operations on the fly, at the wire speed of data transfer, without maintaining a copy of the data. A multiplexer 152 inserts the DIF results into the incoming data, and passes the data (with DIF) to host bus interface 126 for storage as appropriate. The DIF values may be discarded, or they may be stored in the host memory, either together with the corresponding data blocks or in a separate location. As in the inbound flow shown in FIG. 5, DIF engine 150 may store and access DIF context information in QPC 132.

Although the embodiments described above relate, for the sake of clarity, specifically to IB transport of SCSI storage traffic, the principles of the present invention may similarly be applied in data transport over other network types, such as Ethernet, and to other application protocols that use a DIF. For example, as noted above, the network interface device and methods described above may be adapted to operate in Fibre Channel networks, as well as in transmission of Fibre Channel packets over Ethernet and IB. Other protocols that can be supported by the DIF functions described above include, without limitation, iSCSI over Ethernet (iSER) and SCSI RDMA Protocol (SRP).

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A network communication device, comprising:
   a host interface, which is coupled to communicate with a host processor, having a memory, so as to receive a work request to convey one or more data blocks over a network, wherein the work request specifies a memory region of a given data size, and at least one data integrity field (DIF), having a given field size, is associated with the data blocks; and
   network interface circuitry configured to execute an input/output (I/O) data transfer operation responsively to the work request so as to transfer to or from the memory a quantity of data that differs from the data size of the memory region by an integer multiple of the field size, while appending the at least one DIF to the data blocks that are transferred or removing the at least one DIF from the data blocks that are transferred.

2. The device according to claim 1, wherein the network interface circuitry comprises a DIF engine, which is configured to compute a value of the at least one DIF over the one or more data blocks.

3. The device according to claim 2, wherein the DIF engine is configured to verify the at least one DIF by comparing the computed value to a previously-generated value of the at least one DIF that is appended to the one or more data blocks.

4. The device according to claim 3, wherein the network interface circuitry is configured to generate a completion report, for output to the host processor, upon completion of the I/O data transfer, and to incorporate an error indication in the completion report when the DIF engine detects an error in verifying the at least one DIF.

5. The device according to claim 3, wherein the previously-generated value of the at least one DIF is computed in accordance with a first DIF type, and wherein the DIF engine is configured to remove the previously-generated value of the at least one DIF and to compute and append to the transferred data blocks a new DIF in accordance with a second DIF type.

6. The device according to claim 2, wherein the DIF engine is configured to interleave the at least one DIF with the one or more data blocks.

7. The device according to claim 2, wherein the DIF engine is configured to compute the value of the at least one DIF on the fly, without maintaining a copy of the transferred data.

8. The device according to claim 1, wherein the network interface circuitry comprises a DIF strip array for receiving the at least one DIF upon removal of the at least one DIF from the transferred data.

9. The device according to claim 1, wherein the data size of the memory region is equal to a number of bytes that are to be conveyed over the network by the I/O data transfer operation.

10. The device according to claim 1, wherein the memory region is defined in a virtual memory space, and wherein the network interface circuitry comprises a table containing parameters indicating a range of physical addresses in the memory corresponding to the virtual memory space, and the parameters include an offset corresponding to the at least one DIF that is to be appended to or removed from the transferred data blocks.

11. The device according to claim 1, wherein the work request corresponds to a command to write the data from a storage initiator to a storage target, and wherein the I/O data transfer operation comprises a RDMA read operation invoked in response to the work request, comprising a RDMA read request sent from the storage target to the storage initiator and a RDMA read response conveying the data from the storage initiator to the storage target.

12. The device according to claim 1, wherein the work request corresponds to a command from a storage initiator to read the data from a storage target, and wherein the I/O data transfer operation comprises a RDMA write operation, invoked in response to the work request, conveying the data from the storage initiator to the storage target.

13. A method for communication, comprising:
   receiving a work request from a host processor to convey one or more data blocks over a network, wherein the work request specifies a memory region of a given data size, and at least one data integrity field (DIF), having a given field size, is associated with the data blocks; and
   executing, using network interface circuitry, an input/output (I/O) data transfer operation responsively to the work request so as to transfer to or from the memory a quantity of data that differs from the data size of the memory region by an integer multiple of the field size, while appending the at least one DIF to the data blocks that are transferred or removing the at least one DIF from the data blocks that are transferred.

14. The method according to claim 13, wherein appending the at least one DIF comprises computing a value of the at least one DIF over the one or more data blocks.

15. The method according to claim 14, and comprising verifying the at least one DIF by comparing the computed value to a previously-generated value of the at least one DIF that is appended to the one or more data blocks.

16. The method according to claim 15, wherein executing the I/O data transfer comprises generating a completion report, for output to the host processor, upon completion of the I/O data transfer, and incorporating an error indication in the completion report when the DIF engine detects an error in verifying the at least one DIF.

17. The method according to claim 15, wherein the previously-generated value of the at least one DIF is computed in accordance with a first DIF type, and wherein removing the at least one DIF comprises removing the previously-generated value of the at least one DIF, and wherein appending the at least one DIF comprises computing and appending to the transferred data blocks a new DIF in accordance with a second DIF type.

18. The method according to claim 14, wherein appending the at least one DIF comprises interleaving the at least one DIF with the one or more data blocks.

19. The method according to claim 14, wherein the value of the at least one DIF is computed on the fly, without maintaining a copy of the transferred data.

20. The method according to claim 13, wherein removing the at least one DIF comprises transferring the at least one DIF to a DIF strip array upon removal of the at least one DIF from the transferred data.

21. The method according to claim 13, wherein the data size of the memory region is equal to a number of bytes that are to be conveyed over the network by the I/O data transfer operation.

22. The method according to claim 13, wherein the memory region is defined in a virtual memory space, and wherein executing the I/O data transfer operation comprises providing an entry in a table indicating a range of physical addresses in the memory corresponding to the virtual memory space, wherein the entry includes an offset corresponding to the at least one DIF that is to be appended to or removed from the transferred data blocks.

23. The method according to claim 13, wherein the work request corresponds to a command to write the data from a storage initiator to a storage target, and wherein the I/O data transfer operation comprises a RDMA read operation invoked in response to the work request, comprising a RDMA read request sent from the storage target to the storage initiator and a RDMA read response conveying the data from the storage initiator to the storage target.

24. The method according to claim 13, wherein the work request corresponds to a command from a storage initiator to read the data from a storage target, and wherein the I/O data transfer operation comprises a RDMA write operation, invoked in response to the work request, conveying the data from the storage initiator to the storage target.

* * * * *